United States Patent
Peroni et al.

(10) Patent No.: US 10,696,280 B2
(45) Date of Patent: Jun. 30, 2020

(54) VACUUM PUMP WITH ROTOR SHAFT SUPPORTED BY FRICTION BEARINGS

(71) Applicant: PIERBURG PUMP TECHNOLOGY GMBH, Neuss (DE)

(72) Inventors: Giorgio Peroni, Pisa (IT); Raffaele Squarcini, Leghorn (IT); Giacomo Armenio, Leghorn (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 199 days.

(21) Appl. No.: 15/559,830

(22) PCT Filed: Mar. 25, 2015

(86) PCT No.: PCT/EP2015/056452
§ 371 (c)(1),
(2) Date: Sep. 20, 2017

(87) PCT Pub. No.: WO2016/150505
PCT Pub. Date: Sep. 29, 2016

(65) Prior Publication Data
US 2018/0050674 A1     Feb. 22, 2018

(51) Int. Cl.
*F04C 18/344*     (2006.01)
*F04C 29/00*     (2006.01)
(Continued)

(52) U.S. Cl.
CPC .......... *B60T 8/4031* (2013.01); *F04C 18/344* (2013.01); *F04C 25/02* (2013.01);
(Continued)

(58) Field of Classification Search
CPC .... F04C 29/025; F04C 29/028; F04C 27/008; F04C 18/344; F04C 29/0007; F04C 2240/20; B60T 8/4031
(Continued)

(56) References Cited

U.S. PATENT DOCUMENTS 4,507,065 A * 3/1985 Shibuya ................. F04C 29/02
418/15
2008/0159896 A1    7/2008 Kishi et al.
(Continued)

FOREIGN PATENT DOCUMENTS

DE     39 06 823 A1    7/1990
DE     102 47 668 A1    4/2003
(Continued)

OTHER PUBLICATIONS

English translation of JP 03050392 by Dialog, Jun. 7, 2019.*
English translation of EP 1108892 by Espacenet Oct. 15, 2019.*
English translation of FR 2640699 tby Espacenet Oct. 15, 2019.*

*Primary Examiner* — Deming Wan
(74) *Attorney, Agent, or Firm* — Norman B. Thot

(57) ABSTRACT

A mechanical automotive vacuum pump includes a housing with a housing cylindrical bearing surface. A pumping chamber is arranged in the housing. A pump rotor which includes a rotor body having a rotor body bearing section and a chamber section is rotatably supported by the housing. A radial vane slit is arranged at the chamber section. A rotor body cylindrical bearing surface is arranged at the rotor body bearing section. The rotor body bearing section includes a circular lubrication ring groove. A radially shiftable pump vane is supported in the radial vane slit. A friction bearing is defined by the rotor body cylindrical bearing surface and the housing cylindrical bearing surface. The housing cylindrical bearing surface includes a lubrication inlet opening which lies in a same transversal plane as and opposite to the circular lubrication ring groove. The lubrication inlet opening is directly connected to a lubricant pump connector.

24 Claims, 1 Drawing Sheet

(51) Int. Cl.
*F04C 29/02* (2006.01)
*B60T 8/40* (2006.01)
*F04C 25/02* (2006.01)

(52) U.S. Cl.
CPC ........ *F04C 29/0007* (2013.01); *F04C 29/025* (2013.01); *B60T 8/4027* (2013.01)

(58) Field of Classification Search
USPC ... 418/133, 259, 266–268, 253, 255, 76, 75, 418/78
See application file for complete search history.

(56) References Cited

U.S. PATENT DOCUMENTS

| | | | |
|---|---|---|---|
| 2009/0209179 A1* | 8/2009 | Hutchins | B24B 23/026 451/163 |
| 2010/0239440 A1* | 9/2010 | Heaps | F04O 18/3442 417/364 |
| 2015/0345496 A1 | 12/2015 | Cadeddu | |

FOREIGN PATENT DOCUMENTS

| | | | |
|---|---|---|---|
| EP | 0 264 749 A2 | 4/1988 | |
| EP | 0 320 795 A1 | 6/1989 | |
| EP | 1108892 A2 * | 6/2001 | ............. F04C 28/28 |
| FR | 2 640 699 A1 | 6/1990 | |
| FR | 2640699 A1 * | 6/1990 | ............. F04C 28/28 |
| FR | 2 815 088 A1 | 4/2002 | |
| FR | 2 845 735 A1 | 4/2004 | |
| JP | S64-29685 A | 1/1989 | |
| JP | 03050392 A * | 3/1991 | ............ F04C 18/344 |
| JP | H07-127587 A | 5/1995 | |
| JP | 2006-226166 A | 8/2006 | |
| JP | 2008-169792 A | 7/2008 | |
| WO | WO 02/30726 A1 | 4/2002 | |
| WO | WO 03/036094 A2 | 5/2003 | |
| WO | WO 2014/102650 A1 | 7/2014 | |

\* cited by examiner

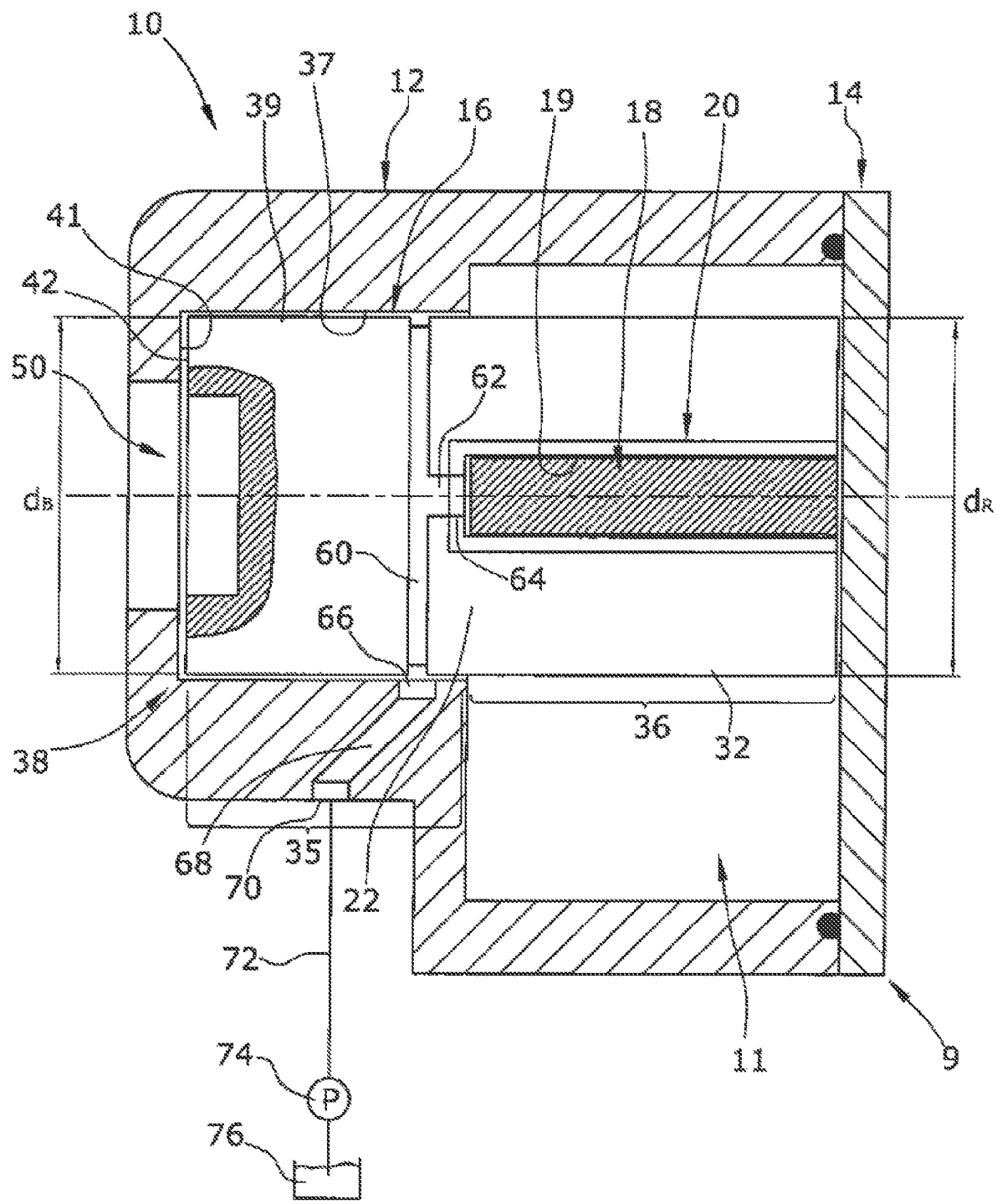

VACUUM PUMP WITH ROTOR SHAFT SUPPORTED BY FRICTION BEARINGS

CROSS REFERENCE TO PRIOR APPLICATIONS

This application is a U.S. National Phase application under 35 U.S.C. § 371 of International Application No. PCT/EP2015/056452, filed on Mar. 25, 2015. The International Application was published in English on Sep. 29, 2016 as WO 2016/150505 A1 under PCT Article 21(2).

FIELD

The present invention is directed to a mechanical automotive vacuum pump with a housing arrangement enclosing a pumping chamber and rotatably supporting a pump rotor.

BACKGROUND

A mechanical automotive vacuum pump is mechanically driven by an engine of the automotive vehicle. The automotive engine is, in most cases, an internal combustion engine.

EP 0 264 749 A2 describes an automotive vacuum pump with a pump rotor with a chamber section and a bearing section. The rotor body is provided with a cylindrical bearing surface which together with a corresponding bearing surface of the pump housing defines a friction bearing at one axial end of the pump rotor. The pump lubrication is realized by a lubricant which is first injected into the rotor interior. The lubricant is pressed from the rotor interior via gaps between the pump rotor and the vane or the pump housing into the pumping chamber. The lubricant is pumped together with pressurized air from the pumping chamber through an air outlet into an outlet chamber. From the outlet chamber, the lubricant is pumped into a circular ring groove which is provided at the cylindrical bearing surface of the pump housing. The lubricant pressure at the friction bearing directly depends, for example, on the pneumatic outlet pressure of the pump.

SUMMARY

An aspect of the present invention is to improve the quality and reliability of the pneumatic sealing of a mechanical automotive vacuum pump.

In an embodiment, the present invention provides a mechanical automotive vacuum pump which includes a housing comprising a housing cylindrical bearing surface. A pumping chamber is arranged in the housing. A pump rotor is configured to be rotatably supported by the housing. The pump rotor comprises a rotor body which comprises a rotor body bearing section and a chamber section. A radial vane slit is arranged at the chamber section. A rotor body cylindrical bearing surface is arranged at the rotor body bearing section. The rotor body bearing section comprises a circular lubrication ring groove. A radially shiftable pump vane is supported in the radial vane slit. A friction bearing is defined by the rotor body cylindrical bearing surface and the housing cylindrical bearing surface. The housing cylindrical bearing surface comprises a lubrication inlet opening which is arranged to lie in a same transversal plane as and opposite to the circular lubrication ring groove. The lubrication inlet opening is directly connected to a lubricant pump connector at the housing.

BRIEF DESCRIPTION OF THE DRAWING

The present invention is described in greater detail below on the basis of embodiments and of the drawing in which:

FIG. 1 shows a longitudinal cross section of a mechanical automotive vacuum pump.

DETAILED DESCRIPTION

In an embodiment, the vacuum pump of the present invention is provided with a housing arrangement enclosing a pumping chamber. The housing arrangement rotatably supports a pump with a rotor body which is functionally separated, as seen in the axial direction, into a bearing section and a chamber section. At the chamber section, the rotor body is provided with a radial vane slit wherein a radially shiftable pump vane is supported. At the bearing section, the rotor body is provided with a cylindrical bearing surface which together with a corresponding cylindrical bearing surface of the housing arrangement defines a radial friction bearing. A circular lubrication ring groove is provided at the rotor body bearing section. A corresponding lubrication inlet opening is provided at the housing-sided bearing surface which lies in the same transversal plane as the ring groove and is arranged radially directly opposite to the ring groove.

The inlet opening opposite the ring groove is directly fluidically connected to a lubricant pump connector at the housing arrangement of the vacuum pump. The lubricant pump connector is not provided at a rotating part of the vacuum pump but is provided at a non-rotating part of the vacuum pump. The term "directly fluidically connected" as used herein means that the lubricant coming from the lubricant pump connector is substantially air-free and substantially has the fluidic pressure as delivered from a lubricant pump to the vacuum pump. The air-free lubricant flows from the inlet opening into the ring groove.

This arrangement provides that the lubricant pressure at the friction bearing directly corresponds to the lubricant pressure as provided by the lubricant pump at the lubricant pump connector of the vacuum pump housing arrangement. This provides that the friction bearing is always lubricated with a constant and relatively high lubricant pressure. Since the lubricant at the friction bearing has a relatively high pressure level, it can be avoided that the lubricant pressure in the friction bearing falls below the pneumatic pressure in the pumping chamber. Pressurized air from the pumping chamber therefore does not flow into the bearing gap of the friction bearing, so that a reliable, tight, and good pneumatic sealing of the pumping chamber is realized in this area of the vacuum pump.

In an embodiment of the present invention, the lubrication ring groove can, for example, be fluidically connected to the vane slit by a connection channel for fluidically connecting the ring groove and the vane slit. The connection channel can be realized as an axial connection groove at the outside surface of the rotor body. The connection channel provides a lubricant supply for the vane section of the rotor body so that the gaps between the radial vane slit and the pump vane are filled with high pressure lubricant.

In an embodiment of the present invention, the lubrication ring groove can, for example, be axially located closer to the chamber-sided end of the friction bearing then to the other axial end of the friction bearing. The lubricant ring groove can, for example, be located in the first axial third of the friction bearing so that the lubrication ring groove is arranged much closer to the chamber section then to the coupling-sided axial end of the rotor body. The closer the lubrication ring groove is located to the chamber section, the better is the pneumatic sealing quality in this area of the friction bearing.

In an embodiment of the present invention, the rotor body diameter $d_R$ of the cylindrical chamber section can, for example, be identical with the rotor body diameter $d_B$ of the cylindrical bearing section so that the radial surface of the rotor body defines a stepless cylinder over substantially the entire rotor body length. The cylindrical rotor body is relatively simple and cost-effective in production. Since the diameter of the friction bearing is relatively high, the mechanical quality of the friction bearing is also relatively high.

In an embodiment of the present invention, the rotor body can, for example, be made out of plastic and be produced by injection molding. A plastic rotor body is relatively light so that acceleration and deceleration of the pump rotor is not as energy-consuming as it would be with a metal rotor body. The mechanical coupling structure of the vacuum pump is therefore mechanically better protected against wear and damage.

In an embodiment of the present invention, only one single radial friction bearing can, for example, be provided, so that only one axial end of the pump rotor is radially supported, whereas the other axial end section of the pump rotor is not radially supported by a radial bearing. The pump rotor is provided with a cantilever bearing structure. The structure of the vacuum pump is simplified and thereby more cost effective in production since only one single radial bearing is provided.

In an embodiment of the present invention, the vane slit can, for example, be axially open at one axial slit end so that one axial front end of the vane is axially in direct axial contact with the housing arrangement, for example, with a housing cover lid.

In an embodiment of the present invention, the pump rotor body can, for example, be provided with an axial bearing ring surface which is axially supported by a corresponding axial bearing ring surface of the housing arrangement. The two bearing ring surfaces together define an axial friction bearing which is arranged at the axial rotor end opposite the rotor chamber section. No housing wall is provided radially inside the ring-like axial friction bearing, so that a mechanical coupling structure at this axial end of the rotor body is accessible for a corresponding coupling structure of a drive. When the vacuum pump has been assembled to an automotive engine, the corresponding coupling structure mechanically drives the pump rotor via the pump coupling structure.

In an embodiment of the present invention, the vane slit can, for example, be defined by a separate slit body made out of metal which is inserted into and is fixed at the plastic rotor body. The plastic rotor body allows for a relatively light pump rotor body, whereas the metal slit body provides a durable and persistent support structure for the shiftable pump vane.

An embodiment of the mechanical automotive vacuum pump according to the present invention is explained below with reference to the enclosed drawing.

FIG. 1 shows a mechanical automotive vacuum pump 10 which provides a total pressure of below 100 mbar for supplying, for example, a pneumatic braking servo device with low pressure. The vacuum pump 10 is mechanically driven by an automotive engine, for example, by an internal combustion engine.

The mechanical automotive vacuum pump 10 comprises a static housing arrangement 9 which supports and substantially houses a rotatable pump rotor 16. The housing arrangement 9 comprises a housing main body 12 for radially enclosing the pump rotor 16 and a separate cover lid 14 for axially closing one axial end of the housing arrangement 9.

The pump rotor 16 comprises a plastic pump rotor body 22 with a substantially cylindrical and stepless outer surface over the entire axial length of the rotor body 22. As a consequence, the outer cylindrical diameter $d_R$ of the pump rotor body 22 at the chamber section 36 is identical with the outer cylindrical diameter $d_B$ of the rotor body 22 at the bearing section 35.

The pump rotor body 22 is axially provided with two functional partitions, namely, the bearing section 35 and the chamber section 36. In the chamber section 36, the rotor body 22 is provided with a vane slit 19 for supporting a radially shiftable pump vane 18 which co-rotates with the pump rotor body 22 in a pumping chamber 11 defined by the housing main body 12. The vane slit 19 is, in the shown embodiment, defined by a separate metal slit body 20 which is fixed to the pump rotor body 22.

In the bearing section 35, the rotor body 22 is provided with a cylindrical bearing surface 39 which defines together with a corresponding cylindrical bearing surface 37 of the housing main body 12 a radial friction bearing 38. The rotor body 22 is cantilevered supported so that only one single axial end of the pump rotor 16 is supported by a radial bearing 38, whereas the other axial end of the pump rotor 16 is not provided with a radial bearing.

The bearing-sided front end of the pump rotor body 22 is provided with an axial bearing ring surface 42 which is axially supported by a corresponding axial bearing ring surface 41 defined by the housing main body 12. The axial bearing ring surfaces 41, 42 together define an axial friction ring bearing. The center of the bearing-sided front end of the pump rotor body 22 is provided with a coupling structure 50 for coupling to a corresponding coupling structure of a pump drive (not shown in FIG. 1). The other front end of the pump rotor body 22 is axially supported by the cover lid 14.

The pump rotor body 22 is provided with a circular lubrication ring groove 60 at the bearing section 35. The ring groove 60 is arranged axially close to the chamber section 36 of the pump rotor body 22 and is, in the shown embodiment, arranged in the first axial fourth of the friction bearing 38 adjacent to the chamber section 36. The outer surface of the pump rotor body 22 is also provided with an axial connection channel 62, and the metal slit body 20 is provided with a continuing axial connection channel 64, so that a fluidic connection is provided between the ring groove 60 and the vane slit 19 via the axial connection channels 62, 64.

The cylindrical bearing surface 37 on the housing side is provided with a lubricant inlet opening 66 radially opposite to the ring groove 60 and thereby lies in the same transversal plane as the ring groove 60. The lubricant inlet opening 66 is fluidically and directly connected to a lubricant pump connector 70 at the housing main body 12 via a lubricant channel 68 within the housing main body 12. When the vacuum pump 10 is mounted to the automotive engine, the lubricant pump connector 70 is fluidically connected to a lubricant pump 74 via a lubricant conduit 72. A lubricant pump 74 pumps a liquid lubricant from a lubricant tank 76 to the lubricant pump connector 70 of the vacuum pump 10.

When the lubricant pump 74 is pumping, the lubricant is pumped to the lubricant pump connector 70, and is pumped via the lubricant channel 68 and the lubricant inlet opening 66 directly to the ring groove 60. The lubricant thereby fills the cylindrical gap between the bearing surfaces 37, 39 of the friction bearing 38, and then flows into the pumping chamber 11. A fraction of the lubricant flows via the connection channels 62, 64 to the vane slit 19, thereby lubricating the gaps between the pump vane 18 and the vane slit 19.

The present invention is not limited to embodiments described herein; reference should be had to the appended claims.

What is claimed is:

1. A mechanical automotive vacuum pump comprising:
a housing comprising a housing cylindrical bearing surface;
a pumping chamber arranged in the housing;
a pump rotor configured to be rotatably supported by the housing, the pump rotor comprising a rotor body which comprises a rotor body bearing section and a chamber section,
wherein,
a radial vane slit is arranged at the chamber section,
a rotor body cylindrical bearing surface is arranged at the rotor body bearing section, and
the rotor body bearing section comprises a circular lubrication ring groove;
a pump vane configured to be radially shiftable, the pump vane being supported in the radial vane slit;
a friction bearing defined by the rotor body cylindrical bearing surface and the housing cylindrical bearing surface; and
a lubricant pump connector,
wherein,
the housing cylindrical bearing surface comprises a lubrication inlet opening which is arranged to lie in a same transversal plane as and opposite to the circular lubrication ring groove,
the lubrication inlet opening is directly connected to the lubricant pump connector at the housing,
the cylindrical chamber section further comprises a first rotor body diameter,
the rotor body bearing section further comprises a second rotor bearing diameter, and
the first rotor body diameter is identical with the second rotor body diameter.

2. The mechanical automotive vacuum pump as recited in claim 1, further comprising:
a connection channel configured to fluidically connect the circular lubrication ring groove to the radial vane slit.

3. The mechanical automotive vacuum pump as recited in claim 2, wherein the connection channel is provided as an axial connection groove at the rotor body.

4. The mechanical automotive vacuum pump as recited in claim 1, wherein,
the friction bearing comprises a first end arranged towards the chamber section and a second end arranged away from the chamber section, and
the circular lubrication ring groove is arranged axially located closer to the first end than to the second end.

5. The mechanical automotive vacuum pump as recited in claim 4, wherein the circular lubrication ring groove is arranged axially in a first axial third of the friction bearing which is closer to the first end.

6. The mechanical automotive vacuum pump as recited in claim 1, wherein the rotor body is made out of a plastic.

7. The mechanical automotive vacuum pump as recited in claim 6, wherein the radial vane slit is defined by a separate slit body made out of metal which is inserted into the rotor body made out of the plastic.

8. The mechanical automotive vacuum pump as recited in claim 1, wherein,
exactly one friction bearing is provided,
exactly one axial end of the pump rotor is radially supported by the exactly one friction bearing, and
the other axial end of the pump rotor is not radially supported by the exactly one friction bearing.

9. The mechanical automotive vacuum pump as recited in claim 1, wherein,
the radial vane slit is configured to be axially open at a first axial end so that an axial front end of the pump vane directly contacts the housing in an axial direction.

10. The mechanical automotive vacuum pump as recited in claim 9, wherein,
the housing further comprises a housing cover lid, and
the radial vane slit is configured to be axially open at the first axial end so that the axial front end of the pump vane directly contacts the housing cover lid in the axial direction.

11. The mechanical automotive vacuum pump as recited in claim 1, wherein,
the housing further comprises an axial bearing ring surface, and
the rotor body bearing section of the pump rotor body further comprises an axial bearing ring surface which is axially supported by the axial bearing ring surface of the housing.

12. The mechanical automotive vacuum pump as recited in claim 1, further comprising:
a drive,
wherein,
the rotor body bearing section of the pump rotor body further comprises a mechanical coupling structure which is configured to mechanically couple the pump rotor to the drive.

13. A mechanical automotive vacuum pump comprising:
a housing comprising a housing cylindrical bearing surface;
a pumping chamber arranged in the housing;
a pump rotor configured to be rotatably supported by the housing, the pump rotor comprising a rotor body which comprises a rotor body bearing section and a chamber section,
wherein,
a radial vane slit is arranged at the chamber section,
a rotor body cylindrical bearing surface is arranged at the rotor body bearing section, and
the rotor body bearing section comprises a circular lubrication ring groove;
a pump vane configured to be radially shiftable, the pump vane being supported in the radial vane slit;
a friction bearing defined by the rotor body cylindrical bearing surface and the housing cylindrical bearing surface; and
a lubricant pump connector,
wherein,
the housing cylindrical bearing surface comprises a lubrication inlet opening which is arranged to lie in a same transversal plane as and opposite to the circular lubrication ring groove,
the lubrication inlet opening is directly connected to the lubricant pump connector at the housing,
the housing further comprises an axial bearing ring surface, and the rotor body bearing section of the pump rotor body further comprises an axial bearing ring surface which is axially supported by the axial bearing ring surface of the housing.

14. The mechanical automotive vacuum pump as recited in claim 13, further comprising: a connection channel configured to fluidically connect the circular lubrication ring groove to the radial vane slit.

15. The mechanical automotive vacuum pump as recited in claim 14, wherein the connection channel is provided as an axial connection groove at the rotor body.

16. The mechanical automotive vacuum pump as recited in claim 13, wherein,
the friction bearing comprises a first end arranged towards the chamber section and a second end arranged away from the chamber section, and
the circular lubrication ring groove is arranged axially located closer to the first end than to the second end.

17. The mechanical automotive vacuum pump as recited in claim 16, wherein the circular lubrication ring groove is arranged axially in a first axial third of the friction bearing which is closer to the first end.

18. The mechanical automotive vacuum pump as recited in claim 13, wherein,
the cylindrical chamber section further comprises a first rotor body diameter,
the rotor body bearing section further comprises a second rotor bearing diameter, and the first rotor body diameter is identical with the second rotor body diameter.

19. The mechanical automotive vacuum pump as recited in claim 13, wherein the rotor body is made out of a plastic.

20. The mechanical automotive vacuum pump as recited in claim 19, wherein the radial vane slit is defined by a separate slit body made out of metal which is inserted into the rotor body made out of the plastic.

21. The mechanical automotive vacuum pump as recited in claim 13, wherein,
exactly one friction bearing is provided,
exactly one axial end of the pump rotor is radially supported by the exactly one friction bearing, and
the other axial end of the pump rotor is not radially supported by the exactly one friction bearing.

22. The mechanical automotive vacuum pump as recited in claim 13, wherein,
the radial vane slit is configured to be axially open at a first axial end so that an axial front end of the pump vane directly contacts the housing in an axial direction.

23. The mechanical automotive vacuum pump as recited in claim 22, wherein,
the housing further comprises a housing cover lid, and
the radial vane slit is configured to be axially open at the first axial end so that the axial front end of the pump vane directly contacts the housing cover lid in the axial direction.

24. The mechanical automotive vacuum pump as recited in claim 13, further comprising:
a drive,
wherein,
the rotor body bearing section of the pump rotor body further comprises a mechanical coupling structure which is configured to mechanically couple the pump rotor to the drive.

* * * * *